(12) United States Patent
Heller et al.

(10) Patent No.: US 9,268,830 B2
(45) Date of Patent: Feb. 23, 2016

(54) MULTIPLE MEDIA TYPE SYNCHRONIZATION BETWEEN HOST COMPUTER AND MEDIA DEVICE

(75) Inventors: David Heller, San Jose, CA (US); Timothy Wasko, High River (CA); Jeff Miller, Mountain View, CA (US); Jesse Boettcher, San Jose, CA (US); Greg Marriott, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1012 days.

(21) Appl. No.: 11/830,645

(22) Filed: Jul. 30, 2007

(65) Prior Publication Data
US 2007/0271312 A1    Nov. 22, 2007

Related U.S. Application Data

(62) Division of application No. 10/973,925, filed on Oct. 25, 2004, now Pat. No. 7,680,849.

(51) Int. Cl.
*G06F 17/30* (2006.01)

(52) U.S. Cl.
CPC ....... *G06F 17/30569* (2013.01); *Y10S 707/913* (2013.01)

(58) Field of Classification Search
USPC ......................................................... 709/248
See application file for complete search history.

(56) References Cited

U.S. PATENT DOCUMENTS

| | | | |
|---|---|---|---|
| 3,990,710 A | 11/1976 | Hughes | |
| 4,528,643 A | 7/1985 | Freeny, Jr. | |
| 4,851,931 A | 7/1989 | Parker et al. | |
| 5,168,481 A | 12/1992 | Culbertson et al. | |
| 5,181,107 A | 1/1993 | Rhoades | |
| 5,191,573 A | 3/1993 | Hair | |
| 5,341,350 A | 8/1994 | Frank et al. | |

(Continued)

FOREIGN PATENT DOCUMENTS

| | | |
|---|---|---|
| EP | 1 056 093 A1 | 11/2000 |
| EP | 1 353 269 A | 10/2003 |

(Continued)

OTHER PUBLICATIONS

"iTunes Celebrates Its First Anniversary; Over 70 Million Songs Purchased," Apr. 28, 2004, http://www.apple.com/pr/library/2004/apr/28itunes.html.

(Continued)

*Primary Examiner* — Backhean Tiv
(74) *Attorney, Agent, or Firm* — Novak Druce Connolly Bove & Quigg LLP

(57) ABSTRACT

Improved techniques for transferring media assets between a host computer and a media device are disclosed. The transfer of media assets between a host computer and a media device can be referred to as synchronization. According to one aspect of the invention, media assets being transferred can be formatted (e.g., rendered) in advance at the host computer and then delivered to the media device. According to another aspect of the invention, media assets can be grouped into collections and transferred on a collection basis. According to still another aspect of the invention, media assets to be transferred can be limited based on an amount of storage capacity available at the media device. According to yet another aspect of the invention, media assets of different media types can be transferred in accordance with different priorities.

31 Claims, 9 Drawing Sheets

(56) References Cited

U.S. PATENT DOCUMENTS

| | | | |
|---|---|---|---|
| 5,355,302 A | 10/1994 | Martin et al. | |
| 5,418,713 A | 5/1995 | Allen | |
| 5,428,735 A | 6/1995 | Kahl et al. | |
| 5,481,509 A | 1/1996 | Knowles | |
| 5,504,852 A | 4/1996 | Thompson-Rohrlich | |
| 5,535,381 A | 7/1996 | Kopper | |
| 5,561,604 A | 10/1996 | Buckley et al. | |
| 5,566,353 A | 10/1996 | Cho et al. | |
| 5,633,839 A | 5/1997 | Alexander et al. | |
| 5,714,971 A | 2/1998 | Shalit et al. | |
| 5,726,909 A | 3/1998 | Krikorian | |
| 5,734,823 A | 3/1998 | Saigh et al. | |
| 5,740,134 A | 4/1998 | Peterson | |
| 5,745,583 A | 4/1998 | Koizumi et al. | |
| 5,751,997 A | 5/1998 | Kullick et al. | |
| 5,819,160 A | 10/1998 | Foladare et al. | |
| 5,832,510 A | 11/1998 | Ito et al. | |
| 5,867,668 A | 2/1999 | Spirakis et al. | |
| 5,875,110 A | 2/1999 | Jacobs | |
| 5,897,642 A | 4/1999 | Capossela et al. | |
| 5,926,819 A | 7/1999 | Doo et al. | |
| 5,983,069 A | 11/1999 | Cho et al. | |
| 5,995,098 A | 11/1999 | Okada et al. | |
| 6,052,797 A | 4/2000 | Ofek et al. | |
| 6,138,245 A | 10/2000 | Son et al. | |
| 6,255,961 B1 | 7/2001 | Van Rzin et al. | |
| 6,263,313 B1 | 7/2001 | Milsted et al. | |
| 6,345,256 B1 | 2/2002 | Milsted et al. | |
| 6,378,129 B1 * | 4/2002 | Zetts | 725/94 |
| 6,407,750 B1 | 6/2002 | Gioscia et al. | |
| 6,411,943 B1 | 6/2002 | Crawford | |
| 6,429,880 B2 | 8/2002 | Marcos et al. | |
| 6,434,680 B2 | 8/2002 | Belknap et al. | |
| 6,442,599 B1 * | 8/2002 | DuLac | H04N 7/17318 348/E7.071 |
| 6,446,080 B1 | 9/2002 | Van Ryzin et al. | |
| 6,452,609 B1 | 9/2002 | Katinsky et al. | |
| 6,502,139 B1 * | 12/2002 | Birk | H04N 7/17318 348/E7.071 |
| 6,694,200 B1 | 2/2004 | Naim | |
| 6,831,881 B2 | 12/2004 | Patil et al. | |
| 6,925,595 B1 | 8/2005 | Whitledge et al. | |
| 6,933,433 B1 | 8/2005 | Porteus et al. | |
| 6,941,324 B2 | 9/2005 | Plastina et al. | |
| 6,956,562 B1 | 10/2005 | O'Hara et al. | |
| 6,959,288 B1 | 10/2005 | Medina et al. | |
| 6,993,532 B1 | 1/2006 | Platt et al. | |
| 6,999,826 B1 | 2/2006 | Zhou et al. | |
| 7,003,495 B1 | 2/2006 | Burger et al. | |
| 7,010,758 B2 | 3/2006 | Bate | |
| 7,022,905 B1 | 4/2006 | Hinman et al. | |
| 7,024,214 B2 | 4/2006 | Loveland | |
| 7,024,491 B1 * | 4/2006 | Hanmann et al. | 709/248 |
| 7,039,656 B1 | 5/2006 | Tsai et al. | |
| 7,043,477 B2 | 5/2006 | Mercer et al. | |
| 7,055,165 B2 | 5/2006 | Connelly | |
| 7,069,058 B2 | 6/2006 | Kawashima | |
| 7,075,000 B2 | 7/2006 | Gang et al. | |
| 7,117,516 B2 | 10/2006 | Khoo et al. | |
| 7,126,770 B1 | 10/2006 | Arai et al. | |
| 7,130,892 B2 | 10/2006 | Mukai | |
| 7,136,934 B2 * | 11/2006 | Carter et al. | 709/248 |
| 7,146,322 B2 | 12/2006 | Cowgill | |
| 7,171,557 B2 * | 1/2007 | Kallahalla | G06F 21/6218 380/277 |
| 7,194,692 B2 | 3/2007 | Marcos et al. | |
| 7,209,633 B1 * | 4/2007 | Novak et al. | 386/46 |
| 7,228,298 B1 | 6/2007 | Raines | |
| 7,272,385 B2 | 9/2007 | Mirouze et al. | |
| 7,283,880 B2 | 10/2007 | Dick | |
| 7,295,983 B2 | 11/2007 | Fujiwara et al. | |
| 7,471,988 B2 | 12/2008 | Smith et al. | |
| 7,478,323 B2 | 1/2009 | Dowdy | |
| 7,502,626 B1 | 3/2009 | Lemilainen | |
| 7,620,363 B2 * | 11/2009 | Spurgat et al. | 455/3.05 |
| 7,647,346 B2 | 1/2010 | Silverman et al. | |
| 7,680,849 B2 | 3/2010 | Heller et al. | |
| 7,765,326 B2 | 7/2010 | Robbin et al. | |
| 7,769,903 B2 | 8/2010 | Robbin et al. | |
| 7,797,446 B2 | 9/2010 | Heller et al. | |
| 8,150,937 B2 | 4/2012 | Ng et al. | |
| 2001/0018858 A1 | 9/2001 | Dwek | |
| 2002/0010788 A1 | 1/2002 | Nathan et al. | |
| 2002/0015161 A1 | 2/2002 | Haneda et al. | |
| 2002/0016968 A1 | 2/2002 | Nathan et al. | |
| 2002/0027561 A1 | 3/2002 | Wu | |
| 2002/0045960 A1 | 4/2002 | Phillips et al. | |
| 2002/0054079 A1 | 5/2002 | Russel | |
| 2002/0073139 A1 | 6/2002 | Hawkins et al. | |
| 2002/0073167 A1 | 6/2002 | Powell et al. | |
| 2002/0078075 A1 | 6/2002 | Colson et al. | |
| 2002/0080180 A1 | 6/2002 | Mander et al. | |
| 2002/0095663 A1 | 7/2002 | Joory | |
| 2002/0113824 A1 | 8/2002 | Myers | |
| 2002/0118300 A1 | 8/2002 | Middleton et al. | |
| 2002/0118848 A1 | 8/2002 | Karpenstein | |
| 2002/0152278 A1 | 10/2002 | Pontenzone et al. | |
| 2002/0156921 A1 | 10/2002 | Dutta | |
| 2002/0174243 A1 | 11/2002 | Spurgat et al. | |
| 2002/0193895 A1 | 12/2002 | Qian et al. | |
| 2002/0194195 A1 | 12/2002 | Fenton et al. | |
| 2003/0014767 A1 | 1/2003 | Stumphauzer | |
| 2003/0030733 A1 * | 2/2003 | Seaman | G06F 17/30017 348/239 |
| 2003/0055723 A1 | 3/2003 | English | |
| 2003/0065802 A1 | 4/2003 | Vitikainen et al. | |
| 2003/0093340 A1 | 5/2003 | Krystek et al. | |
| 2003/0098893 A1 | 5/2003 | Makinen | |
| 2003/0149628 A1 | 8/2003 | Abbosh et al. | |
| 2003/0158737 A1 | 8/2003 | Csicsatka | |
| 2003/0197725 A1 | 10/2003 | Tuli | |
| 2003/0206203 A1 | 11/2003 | Ly | |
| 2004/0003151 A1 | 1/2004 | Bateman et al. | |
| 2004/0068536 A1 * | 4/2004 | Demers | G06F 17/30899 709/201 |
| 2004/0083480 A1 | 4/2004 | Dodge | |
| 2004/0091235 A1 * | 5/2004 | Gutta | G11B 27/034 386/295 |
| 2004/0093274 A1 | 5/2004 | Vanska et al. | |
| 2004/0103102 A1 | 5/2004 | Nelson | |
| 2004/0113915 A1 | 6/2004 | Ohtsuki et al. | |
| 2004/0123242 A1 | 6/2004 | McKibben | |
| 2004/0123725 A1 | 7/2004 | Kim | |
| 2004/0128198 A1 | 7/2004 | Register et al. | |
| 2004/0128277 A1 | 7/2004 | Mander et al. | |
| 2004/0139180 A1 * | 7/2004 | White | H04L 29/06 709/221 |
| 2004/0139844 A1 | 7/2004 | Tsuboi | |
| 2004/0148358 A1 | 7/2004 | Singh et al. | |
| 2004/0193900 A1 | 9/2004 | Nair | |
| 2004/0205028 A1 | 10/2004 | Verosub et al. | |
| 2004/0216108 A1 | 10/2004 | Robbin | |
| 2004/0236568 A1 | 11/2004 | Giuillen et al. | |
| 2004/0242224 A1 | 12/2004 | Janik et al. | |
| 2004/0252604 A1 | 12/2004 | Johnson et al. | |
| 2004/0261064 A1 | 12/2004 | Goldstein et al. | |
| 2004/0267825 A1 * | 12/2004 | Novak | G06F 17/30578 1/1 |
| 2005/0010616 A1 | 1/2005 | Burks | |
| 2005/0055444 A1 | 3/2005 | Venkatasubramanian | |
| 2005/0055718 A1 | 3/2005 | Stone | |
| 2005/0060264 A1 | 3/2005 | Schrock et al. | |
| 2005/0102329 A1 | 5/2005 | Jiang et al. | |
| 2005/0147130 A1 * | 7/2005 | Hurwitz | G06F 17/30578 370/503 |
| 2005/0149392 A1 | 7/2005 | Gold et al. | |
| 2005/0235015 A1 * | 10/2005 | Abanami | G06F 17/30176 1/1 |
| 2005/0249080 A1 | 11/2005 | Foote et al. | |
| 2005/0267803 A1 | 12/2005 | Patel et al. | |
| 2005/0278377 A1 | 12/2005 | Mirrashidi et al. | |
| 2006/0027080 A1 | 2/2006 | Schultz | |
| 2006/0036567 A1 | 2/2006 | Tan | |
| 2006/0090202 A1 | 4/2006 | Liu et al. | |

(56) References Cited

U.S. PATENT DOCUMENTS

| | | | |
|---|---|---|---|
| 2006/0100978 A1 | 5/2006 | Heller et al. | |
| 2006/0106806 A1 | 5/2006 | Sperling | |
| 2006/0143455 A1 | 6/2006 | Gitzinger | |
| 2006/0159109 A1 | 7/2006 | Lamkin et al. | |
| 2006/0163358 A1 | 7/2006 | Biderman | |
| 2006/0224620 A1 | 10/2006 | Silverman et al. | |
| 2006/0230081 A1 | 10/2006 | Craswell | |
| 2006/0247980 A1 | 11/2006 | Mirrashidi et al. | |
| 2006/0288057 A1 | 12/2006 | Coffins et al. | |
| 2007/0033052 A1 | 2/2007 | Cowgill | |
| 2007/0067309 A1 | 3/2007 | Klein et al. | |
| 2007/0073728 A1 | 3/2007 | Klein et al. | |
| 2007/0088727 A1 | 4/2007 | Kindig | |
| 2007/0130541 A1 | 6/2007 | Louch et al. | |
| 2007/0185919 A1 | 8/2007 | Kaplan et al. | |
| 2007/0198746 A1* | 8/2007 | Myllyla et al. | 709/248 |
| 2007/0220552 A1 | 9/2007 | Juster et al. | |
| 2007/0291323 A1 | 12/2007 | Roncal | |
| 2008/0018927 A1 | 1/2008 | Martin et al. | |
| 2008/0028008 A1 | 1/2008 | Brunet et al. | |
| 2008/0168185 A1 | 7/2008 | Robbin et al. | |
| 2008/0168245 A1 | 7/2008 | DeAtley et al. | |
| 2008/0168391 A1* | 7/2008 | Robbin et al. | 715/810 |
| 2008/0168525 A1 | 7/2008 | Heller | |
| 2008/0168526 A1* | 7/2008 | Robbin et al. | 725/139 |
| 2008/0256378 A1 | 10/2008 | Guillorit | |
| 2009/0063496 A1 | 3/2009 | Cunningham et al. | |
| 2009/0063543 A1 | 3/2009 | Martin et al. | |
| 2009/0123091 A1* | 5/2009 | Belz et al. | 382/305 |
| 2009/0228544 A1* | 9/2009 | Demers | G06F 17/30058 709/201 |
| 2009/0290725 A1 | 11/2009 | Huang | |

FOREIGN PATENT DOCUMENTS

| | | |
|---|---|---|
| EP | 1408427 A2 | 4/2004 |
| EP | 1 429 569 A | 6/2004 |
| JP | 2000-285656 A | 10/2000 |
| JP | 2001-76465 | 3/2001 |
| JP | 2001/291365 A | 10/2001 |
| JP | 2002/74909 A | 3/2002 |
| JP | 2003-077214 | 3/2003 |
| JP | 2003-303137 | 10/2003 |
| JP | 2003-319485 | 11/2003 |
| KR | 10-2001-0063284 A | 7/2001 |
| KR | 10-2001-0079176 A1 | 8/2001 |
| KR | 10-2002-0011027 | 2/2002 |
| KR | 10-2002-0011027 A | 2/2002 |
| KR | 10-2006-0035634 A | 12/2004 |
| KR | 10-2006-0035634 A | 4/2006 |
| KR | 10-0599204 B1 | 7/2006 |
| WO | WO 94/08337 | 4/1994 |
| WO | WO 00-43914 A1 | 7/2000 |
| WO | WO 03/025933 | 3/2003 |
| WO | 03/050703 A1 | 6/2003 |
| WO | WO 2004/034286 A1 | 4/2004 |
| WO | WO 2004/057474 | 7/2004 |
| WO | WO 2005/060387 A2 | 7/2005 |
| WO | 2005073856 A2 | 8/2005 |
| WO | WO 2005-114472 A1 | 12/2005 |
| WO | WO 2006/047578 A2 | 5/2006 |

OTHER PUBLICATIONS

"Rio Portable Music Player," Independent Web Review, downloaded Jan. 25, 2002, http://www.webreviews.com/9901/rio.html.
Breen, Christopher, "iMixing it Up: Sharing Your Sounds," Sep. 17, 2004, http://playlistmag.com/help/2004/09/imixhowto/index.php.
Kawamoto et al., "On 1st Birthday, iTunes Unwraps New Features," Apr. 28, 2004, http://news.com.com/On+1st+birthday,+iTunes+unwraps+new+features/2100-1027_3-5201598.html.
RealJukebox, Real Networks, Inc., webpages downloaded Oct. 27, 2005 http://www.real.com/Jukebox/release_notes.html#.
PBS Local Insertion Server Instruction Manual, Microvision, Inc., pp. 1-71, Jun. 19, 1996.
Wave Station Digital Audio Automation System, Instruction & Operations Manual Broadcast Software International, pp. 1-113, Feb. 4, 1997.
Nielsen et al., "Comparative Design Review: An Exercise in Parallel Design", Interchi '93, pp. 414-417Apr. 24-29, 1993.
Lowery Daryl, "Random-Access Digital Audio—Recording Systems", pp. 68-71, Jun. 1992.
Sadie Master System, Product Brochure, Studio audio Digital Equipment Inc., 2 pgs., Jan. 1995.
RCS Works-Cart Wall User's Guide and Reference Manual, pp. 1-83, Feb. 7, 1993.
"Digital Audio Just Got Easier!", CartWorks Digital Audio Systems, dbm Systems, Inc., Jun. 26, 1996.
"CartWorks File Utilities User's Manual", dbm Systems, Inc., pp. 1-8., Jul. 1998.
"CartWorks MHD Music-on-Hard-Drive QuickSchedule User's Manual", dbm Systems, Inc., pp. 1-8, Feb. 8, 1998.
"CartWorks MHD Music-on-Hard-Drive User's Manual V6.8", dbm Systems, Inc., pp. 1-11, Feb. 1998.
"CartWorks On-Demand Editor User's Manual", dbm Systems, Inc., pp. 1-7., Feb. 1998.
"CartWorks Script Editor User's Manual v3.12", dbm Systems, Inc., pp. 1-26., Feb. 1998.
"CartWorks Spot Set Editor User's Manual", dbm Systems, Inc., pp. 1-11., Feb. 1998.
"The DADpro Digital Audio Delivery System Operation Manual Version 1.0", IBM Corp., pp. 1-424, Aug. 30, 1996.
"Virtual Recorder—Basic Operations", ASC Audio Video Corporation, pp. 1-94, Sep. 9, 1996.
"Broadcast Tools: SpotBase, Playlist & TapeBase", ASC Audio Video Corporation, pp. 1-2., Mar. 1998.
"VR 300 Advanced Broadcast Video Server", ASC Audio Video Corporation, pp. 1-9., Mar. 1998.
"VR300 Video Server User Manual, Version 1.0", ASC Audio Video Corporation, pp. 1-40, Mar. 20, 1998.
"Gravis WinDecks Version 1.12", screen shots, Gravis Computer Technology Ltd., pp. 1-10., Jan. 1990.
WinDecks, User Instructions, Gravis Computer Technology Ltd., pp. 1-14., Jan. 1990.
Office Action from European Patent Office for European Patent Application 05 823 337.0 dated Feb. 21, 2008.
Office Action from Chinese Patent Office for Chinese Patent Application 200580036575.8 dated May 23, 2008 (with translations).
Windows XP Service Pack 2, Figures 1-2 and "How to obtain the latest Windows XP service pack," Aug. 25, 2004.
Half-life—Wikipedia, the free encyclopedia, http://enwikipedia.org/wiki/Halfe-life, downloaded Feb. 22, 2009.
Mabini. MemMaid Review. Pocket PC Dubai, Jul. 23, 2004[online], [retrieved on Mar. 26, 2008]. Retrieved from the Internew <URL: http://www.pocketpcdubai.com/DinarSoft/memmaid_review.html>.
Torrone, Phillip, How-To: Getting Podcasts on a Portable Media Center (and other Windows Media Devices, Oct. 2004.
Iriver, "PMP140/120", Sep. 13, 2004, 1-2 pgs.
MG-25, Portable MPEG4 Player (MG-25), Jul. 29, 2004, 1-3 pgs.
Nutzel et al., "Sharing Systems for Future HiFi Systems", Proceedings of the Fourth International Conference on Web Delivering of Music, Sep. 13, 2008, 8 pgs.
Wikipedia: "iTunes", www.wikipedia.com, May 9, 2005, 6 pages.
"Diamond Multimedia Announces Rio PMP300 Portable MP3 Music Player", Press Release, http://news.harmony-central.com/Newp/1998/Rio-PMP300.html, Sep. 14, 1998, 4 pgs.
M. Nilsson; ID3 tag version 2.3.0; Feb. 3, 1999, http://www.id3lib.org/id3v2.3.0.html.
M. Nilsson;IDS tag verions 2.4.0—Main Structure; Nov. 1, 2000; http://www.id3.org/id3v2.4.0-structure.
Notification of Second Office Action for Chinese Patent Application 200580036575.8, dated Sep. 18, 2009.
Skarlatos et al., "Sprite Software Sprite Backup 5.0", Internet Publication, www.pocketnow.com/index.php?a+portal_print&t=review&id=788, Mar. 6, 2005.

(56) References Cited

OTHER PUBLICATIONS

Apple Inc., "Apple-Downloads-Dashboard", http://www.apple.com/downloads/dashboard, downloaded Dec. 16, 2008, pp. 1-2.

GUI Widget, Wikipedia.org., http://en.wikipedia.org.wiki/Widget_(computing), downloaded Dec. 29, 2008, pp. 1-2.

Top Stores of Dec. 18, 2001: Apple posts Automated Scripts for iTunes 2.03. pp. 11, obtained from the internet at: http://www.xlr8yourmac.com.

iTunes-perl, copyright 2004-2006 by Jay McGavren, obtained from the Internet at http://code.google.com, pp. 7.

Pocket Tunes 5.0.0, copyright 2002-2009 Normsoft, Inc., pp. 1-25, obtained from the Internet at: http://www.pocket-tunes.com.

"Perfect guide for digital/audio technique to enjoy music in PC", Nobuya Fukuda, published in "Nikkei Click", Japan, Nikkei business Publications, Inc., Sep. 8, 1999, vol. 6/No. 10, p. 169.

Rejection Decision for Chinese Patent Application No. 200580036575.8, dated May 12, 2010.

Notification of the First Office Action for Chinese Patent Application No. 200810215219.8, mailed Jul. 6, 2010.

U.S. Appl. No. 12/830,234, entitled "Intelligent interaction between media player and host computer", filed Jul. 2, 2010.

Bott, "Special Edition Using Microsoft 1-18 Windows Millennium Passage", Special Edition Using Microsoft Windows Millennium Edition, Nov. 3, 2000, pp. 1-24.

"SyncML Data Sync Protocol version 1.1.2" Open Mobile Alliance, Jun. 12, 2003, 1-63 pgs.

* cited by examiner

MULTIPLE MEDIA TYPE SYNCHRONIZATION BETWEEN HOST COMPUTER AND MEDIA DEVICE

CROSS-REFERENCE TO RELATED APPLICATIONS

This application is a divisional of U.S. application Ser. No. 10/973,925, filed Oct. 25, 2004 (now U.S. Pat. No. 7,680,849), and entitled "MULTIPLE MEDIA TYPE SYNCHRONIZATION BETWEEN HOST COMPUTER AND MEDIA DEVICE," which is hereby incorporated herein by reference; This application is related to: (i) U.S. application Ser. No. 10/973,657, filed Oct. 25, 2004, and entitled "IMAGE SCALING ARRANGEMENT," which is hereby incorporated herein by reference; (ii) U.S. application Ser. No. 10/987,649, filed Nov. 12, 2004, and entitled "WIRELESS SYNCHRONIZATION BETWEEN MEDIA PLAYER AND HOST DEVICE," which is hereby incorporated herein by reference; (iii) U.S. application Ser. No. 10/277,418, filed Oct. 21, 2002, and entitled "INTELLIGENT INTERACTION BETWEEN MEDIA PLAYER AND HOST COMPUTER," which is hereby incorporated herein by reference; and (iv) U.S. application Ser. No. 10/118,069, filed Apr. 5, 2002, and entitled "INTELLIGENT SYNCHRONIZATION OF MEDIA PLAYER WITH HOST COMPUTER," which is hereby incorporated herein by reference.

BACKGROUND OF THE INVENTION

1. Field of the Invention

The present invention relates to media devices and, more particularly, to synchronization or management of media on media devices.

2. Description of the Related Art

Synchronization operations have been conventionally performed between portable devices, such as Personal Digital Assistants (PDAs) and host computers, to synchronize electronic files or other resources. For example, these files or other resources can pertain to text files, data files, calendar appointments, emails, to-do lists, electronic rolodexes, etc. However, such synchronization schemes tend to utilize filenames and modification dates to determine whether files need to be copied between the devices.

In the case of media players, such as music players, files are typically moved between a host computer and a media player through use of a drag and drop operation, like that conventionally done with respect to copying of a data file from a Windows desktop to a floppy disk. Hence, a user of the media player manually initiates the synchronization for individual media assets. As a consequence, synchronization also tends to be tedious and time consuming for users. Synchronization tends to be slow because data is transmitted between devices over a slow link. More recently, synchronization of a music player with a host computer has been able to be automatically initiated once a bus connection over a peripheral cable connects the music player to the host computer. As an example of such a system, see U.S. Patent Publication No.: 2003/0167318 A1. However, such automated synchronization involves media assets of a single media type, namely songs. Other media types, such as images, present new and different challenges when attempting to provide synchronization.

Thus, there is a need for improved techniques for improved approaches to synchronize media devices and host computers.

SUMMARY OF THE INVENTION

The invention relates to improved techniques for transferring media assets between a host computer and a media device. The transfer of media assets between a host computer and a media device can be referred to as synchronization. According to one aspect of the invention, media assets being transferred can be formatted (e.g., rendered) in advance at the host computer and then delivered to the media device. According to another aspect of the invention, media assets can be grouped into collections and transferred on a collection basis. According to still another aspect of the invention, media assets to be transferred can be limited based on an amount of storage capacity available at the media device. According to yet another aspect of the invention, media assets of different media types can be transferred in accordance with different priorities.

The invention can be implemented in numerous ways, including as a method, system, device, apparatus, or computer readable medium. Several embodiments of the invention are discussed below.

As a method for synchronizing media assets between a host computer and a media device, one embodiment of the invention includes at least the acts of: identifying media assets at the host computer to be synchronized to the media device, the media assets being associated with one or more media collections; determining which of the identified media assets are not already stored on the media device; determining a priority for each of the one or more media collections that include the determined media assets; and copying the determined media assets of the one or more media collections from the host computer to the media device, the copying being performed on a media collection basis in accordance with the priority for the associated media collection, and being performed only to the extent of available storage space on the media device.

As a method for synchronizing media assets between a host computer and a media device, another embodiment of the invention includes at least the acts of: identifying media assets residing on the host computer that are to be copied to the media device; determining whether the media device has adequate available storage capacity to store the identified media assets; determining priorities associated with the identified media assets; reducing the identified media assets that are to be copied to the media device in accordance with the priorities when it is determined that the media device has inadequate available storage capacity to store the identified media assets; and copying the identified media assets to the media device.

As a method for copying media assets from a host computer to a media device, one embodiment of the invention includes at least the acts of: identifying a number of media assets of a first type to be copied from the host computer to the media device; determining whether the media device has adequate available storage capacity to store the identified media assets of the first type; reducing the number of media assets of the first type to be copied when it is determined that the media device has inadequate available storage capacity; copying the identified media assets of the first type to the media device; identifying a number of media assets of a second type to be copied from the host computer to the media device; determining whether the media device has adequate available storage capacity to store the identified media assets of the second type, with or assuming that the copying has already been performed; reducing the number of media assets of the second type to be copied when it is determined that the media device has inadequate available storage capacity; and copying the identified media assets of the second type to the media device.

As a computer readable medium including at least computer program code for synchronizing media assets between a host computer and a media device, one embodiment of the invention includes at least: computer program code for identifying media assets at the host computer to be synchronized to the media device, the media assets being associated with one or more media collections; computer program code for determining which of the identified media assets are not already stored on the media device; computer program code for determining a priority for each of the one or more media collections that include the determined media assets; and computer program code for copying the determined media assets of the one or more media collections from the host computer to the media device, such copying being performed on a media collection basis in accordance with the priority for the associated media collection, and being performed only to the extent of available storage space on the media device.

As a computer readable medium including at least computer program code for synchronizing media assets between a host computer and a media device, another embodiment of the invention includes at least: computer program code for identifying media assets residing on the host computer that are to be copied to the media device; computer program code for determining whether the media device has adequate available storage capacity to store the identified media assets; computer program code for determining priorities associated with the identified media assets; computer program code for reducing the identified media assets that are to be copied to the media device in accordance with the priorities when it is determined that the media device has inadequate available storage capacity to store the identified media assets; and computer program code for copying the identified media assets to the media device.

As a computer readable medium including at least computer program code for copying media assets from a host computer to a media device, one embodiment of the invention includes at least: computer program code for identifying a number of media assets of a first type to be copied from the host computer to the media device; computer program code for determining whether the media device has adequate available storage capacity to store; computer program code for identifying a number of media assets of a second type to be copied from the host computer to the media device; computer program code for determining whether the media device has adequate available storage capacity to store the identified media assets of the first type and the identified media assets of the second type; computer program code for reducing the number of media assets of the second type to be copied when it is determined that the media device has inadequate available storage capacity for both the identified media assets of the first type and the identified media assets of the second type; and computer program code for copying the identified media assets of the first type and the second type to the media device.

As a computing apparatus for providing media assets to a media device, one embodiment of the invention includes at least: an input/output interface that detects connection with the media device, a data store that stores the media assets, and a processor. The processor is configured to obtain media device capabilities of the media device, identify original media assets on the host computer that are to be copied to the media device, determine media formats based on the media device capabilities, generate, for each of the original media assets, a set of formatted media assets in accordance with the media formats, and copy the set of formatted media assets to the media device.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques for transferring media assets between a host computer and a media device. The transfer of media assets between a host computer and a media device can be referred to as synchronization. According to one aspect of the invention, media assets being transferred can be formatted (e.g., rendered) in advance at the host computer and then delivered to the media device. According to another aspect of the invention, media assets can be grouped into collections and transferred on a collection basis. According to still another aspect of the invention, media assets to be transferred can be limited based on an amount of storage capacity available at the media device. According to yet another aspect of the invention, media assets of different media types can be transferred in accordance with different priorities.

Embodiments of this aspect of the invention are discussed below with reference to FIGS. 1-6. However, those skilled in the art will readily appreciate that the detailed description given herein with respect to these figures is for explanatory purposes as the invention extends beyond these limited embodiments.

Figure 1:
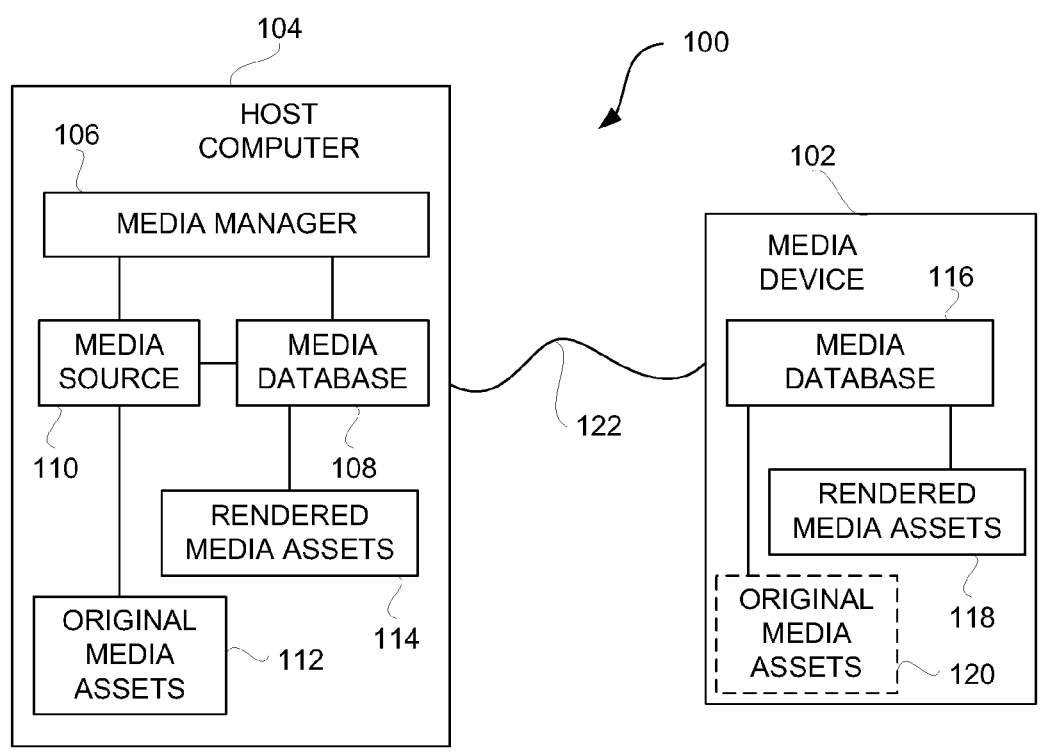
FIG. 1 is a block diagram of a synchronization system according to one embodiment of the invention.

FIG. 1 is a block diagram of a synchronization system 100 according to one embodiment of the invention. The synchronization system 100 includes a media device 102 and a host computer 104. The media device 102 is, for example, a portable, battery-operated media player. The host computer 104 includes a media manager 106. The media manager 106 enables a user of the host computer 104 to manage media assets stored on the host computer 104. For example, the media manager 106 facilitates a user with browsing, organizing, viewing, playing or other operations with respect to various media assets. In one embodiment, the media manager 106 is a media management application.

The various media assets can be of one or more different media types. One exemplary type of media asset is an audio file (e.g., song). Another exemplary type of media asset is an image file (e.g., photo). Still another exemplary type of media asset is a video file (e.g., movie). The media assets can also be grouped into collections. One example of a collection is an album.

The host computer 104 further includes a media database 108 and a media source 110. The media source 110 references original media assets 112 that are stored in a data storage device (e.g., disk drive, FLASH memory) of the host computer 104. The media database 108 stores media information pertaining to the original media assets 112. To facilitate use of the original media assets 112 on the media device 102, the media manager 106 operates to produce rendered media assets 114 from the original media assets 112. The rendered media assets 114 are formatted for use by the media device 102.

The media device 102 includes a media database 116 and rendered media assets 118. The media device 102 may also include original media assets 120. The rendered media assets 118 are copies of some or all of the rendered media assets 114, and the original media assets 120 are copies of some or all of the original media assets 112. Typically, the media player 102 will include a data storage device (e.g., disk drive, FLASH memory) for storing media assets, a cache memory for storing a media asset in-use, a screen display for displaying information to a user, and a processor (e.g., microprocessor) for controlling operation of the media device 102.

A peripheral cable 122 provides a data path (or data link) between the media device 102 and the host computer 104. Typically, the peripheral cable 122 couples together data ports provided on the media device 102 and the host computer 104. The peripheral cable 122 provides a peripheral bus that couples the media device 102 to the host computer 104. The peripheral bus, for example, could be a FIREWIRE bus or a Universal Serial Bus (USB).

A synchronization operation between the media assets stored on the host computer 104 and the media assets stored on the media device 204 can be achieved in a sophisticated manner through comparison of media information stored in the respective media databases 108 and 116. The media information can pertain to one or more types of media assets. When comparison of the media information from the respective databases 108 and 116 indicates that there is a particular media asset resident on the host computer 104 but not on the media device 102, then the particular media asset can be transmitted (downloaded) to the media player over the peripheral cable 122. On the other hand, when the comparison of the media information from the respective databases 108 and 116 indicates that a particular media asset is resident on the media device 102 but not on the host computer 104, then the particular media asset can be either removed (deleted) from the media device 102 or transmitted (e.g., uploaded) over the peripheral cable 122 to the host computer 104. Hence, by providing the media device 102 with the media database 116, more sophisticated synchronization and management of media content is enabled. In one embodiment, the media information includes media attributes of the media assets which can be compared to determine which media assets are to be transferred. In one example, the media attributes include at least a title and an artist name for media assets that are audio files. In another example, the media attributes include an identifier, a modification date and a size for media assets that are image files.

The media database 116 also allows the media device 102 to present a user interface to the user that is more sophisticated then conventional approaches. Such a user interface can be presented on the screen display of the media device 102. The user interface can, for example, allow the user of the media device 202 to browse, sort, search, play, view, etc. the media assets resident on the media device 102. The user interface can also allow the user of the media device 102 to download (add) or delete (remove) media assets from the media device 102. When the media assets are images that are to be viewed, the media device is able to rapidly display the media assets using the associated one of the rendered media assets (previously formatted) for display on the screen display.

The media manager 106 also has a user interface that allows a user to browse, sort, search, play, view, make playlists, burn Compact Discs (CDs), make collections (e.g., albums), etc. the media assets resident on the host computer 204. The user interface can also allow the user of the host computer 104 to download (add) or delete (remove) media assets from the host computer 104. In one embodiment, the media manager 106 and its associated user interface are provided by iTunes, version 2.0, from Apple Computer, Inc. of Cupertino, Calif.

In one embodiment, the media device is a portable computing device dedicated to processing media such as audio, video or images. For example, the media device 102 can be a music player (e.g., MP3 player), a game player, a video player, a video recorder, a camera, an image viewer and the like. These devices are generally battery operated and highly portable so as to allow a user to listen to music, play games or video, record video, play video, take pictures or view pictures wherever the user travels. In one implementation, the media device 102 is a handheld device that is sized for placement into a pocket or hand of the user. By being handheld, the media device 102 is relatively small and easily handled and utilized by its user. By being pocket sized, the user does not have to directly carry the media device 102 and therefore the media device 102 can be taken almost anywhere the user travels (e.g., the user is not limited by carrying a large, bulky and often heavy device, as in a portable computer). Furthermore, the media device 102 may be operated by the user's hands without the need for a reference surface such as a desktop.

According to one embodiment of the invention, the media device is a media player, and the media content on the media player is detailed in a media database residing on the media player. The host computer also stores a media database of the media content on the host computer. Then, on synchronization, the media information stored in the respective media databases can be compared to determine which, if any, media assets are to be copied from the host computer to the media player. For example, the media assets can pertain to media files for songs, and the media information from the respective databases being compared might include song title, album name and artist name. As another example, the media assets can pertain to media files for images, and the media information from the respective databases being compared might include an image identifier, a modification date and a file size. As a result, the synchronization process is able to be more intelligently performed. Media assets can also be removed (or deleted) from the media player if no longer present on the host computer. In other embodiments, media assets can additionally or alternatively be copied from the media player to the host computer.

Figure 2:
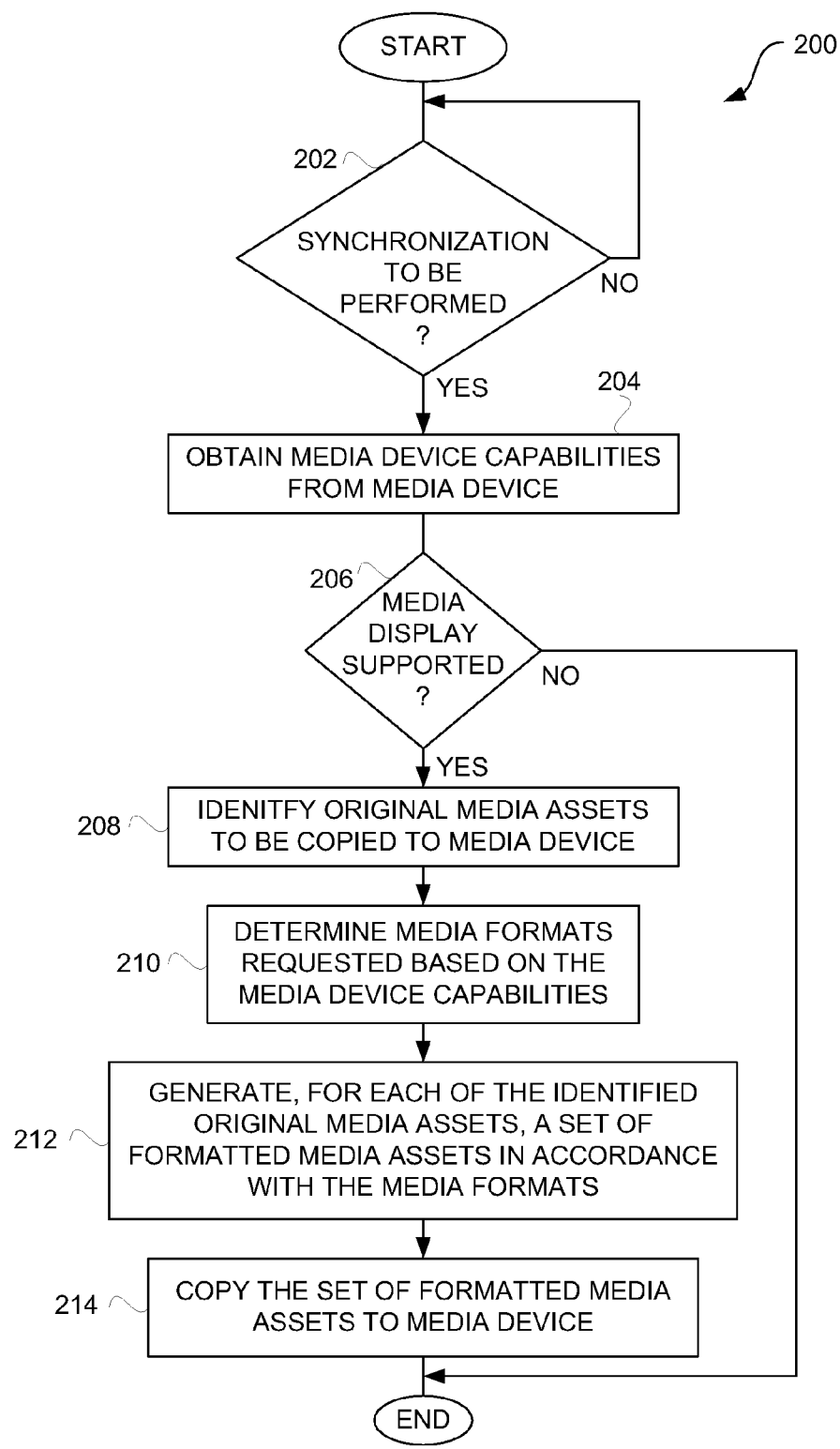
FIG. 2 is a synchronization process according to one embodiment of the invention.

FIG. 2 is a synchronization process 200 according to one embodiment of the invention. The synchronization process 200 is performed by a media manager, such as the media manager 106 within the host computer 104 illustrated in FIG. 1.

The synchronization process 200 begins with a decision 202 that determines whether synchronization is to be performed. When the decision 202 determines that synchronization is not to be performed, the synchronization process 200 merely waits until an appropriate time to perform synchronization. In this regard, the synchronization process 200 can be deemed invoked once synchronization is to be performed. As an example, synchronization can be performed at the request of a user of the host computer or automatically when a media device is connected to the host computer.

In any case, once the decision 202 determines that synchronization is to be performed, media device capabilities are requested 204 from the media device. The media device is aware of its media device capabilities and can supply its media device capabilities to the host computer upon request. The media device capabilities can define characteristics, capabilities and/or preferences for the media device. As an example, the media device capabilities can indicate media types that are supported by the media device, display formats supported or desired by the media device, and available storage capacity for additional media assets. In an alternative embodiment, the media device capabilities can be stored on the host computer and accessed using an identifier provided by the media device.

Next, a decision 206 determines whether media display is supported by the media device. The display of the media assets for the media device can be directly on a display device of the media device or indirectly by an external display device controlled by the media device. Here, it is assumed that some of the media devices that can couple to a host computer are able to display media, but others are not. When the media device does not support media display, the synchronization process 200 is complete and ends because it is assumed that the media assets to be synchronized by the synchronization process 200 pertain to the display of such media assets.

On the other hand, when the decision 206 determines that media display is supported by the media device, original media assets residing on the host computer that are to be copied to the media device are identified 208. As discuss in greater detail below, the original media assets to be copied to the media device can be influenced by user selections as well as those media assets already present on the media device.

In addition, media formats requested are determined 210 based on the media device capabilities. Here, the media device capabilities can indicate one or a plurality of media formats, such as display formats, that are desired by the media device. For example, the media device can include in the media device capabilities those display formats (e.g., rendered formats) that the media device supports. Then, a set of formatted media assets (e.g., rendered media assets) can be generated 212 for each of the original media assets in accordance with the media formats. In one embodiment, the host computer may be aware of those of the formatted media assets already present on the media device and, in such case, the host computer may have already generated certain of the formatted media assets and thus need not generate them again. After the set of formatted media assets have been generated for each of the identified original media assets, the set of formatted media assets can be copied 214 to the media device. Optionally, the identified original media assets can also be copied to the media device.

The media device utilized in accordance with the present invention can store a large number of media assets. These media assets can be of the same type or different type of media asset. For example, one type of media asset is audio files, such as music or songs. Another type of media assets are images, such as photos. The media device includes a media memory that is able to store media assets that have been copied to the media device. However, media storage to the media memory is limited at the media device. Hence, it is not always possible to store all of the media assets that are to be copied to the media device within the media memory. As a result, another aspect of the invention uses different priority levels to prioritize which of the media assets should be stored to the media memory.

Figure 3:
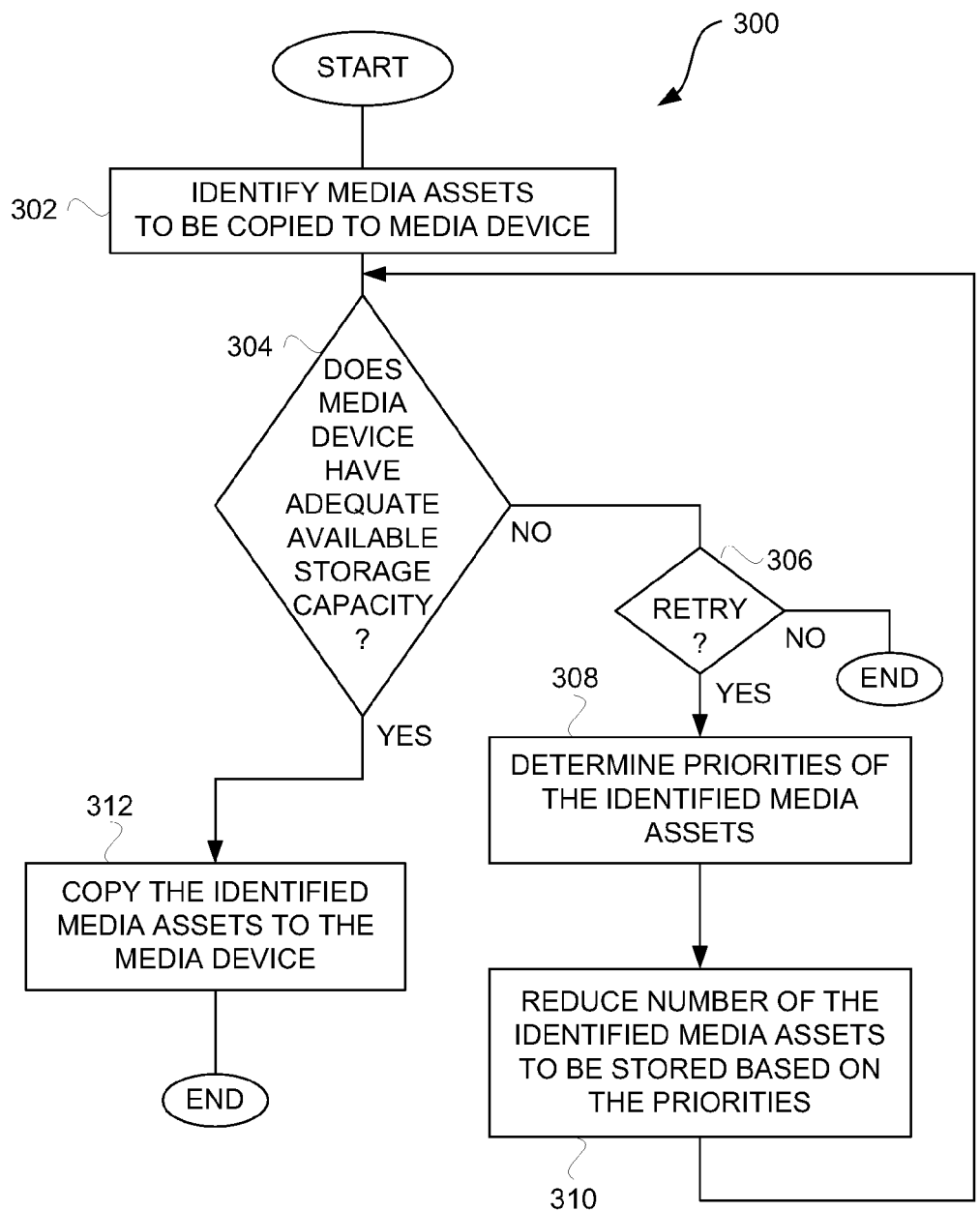
FIG. 3 is a flow diagram of a synchronization process according to another embodiment of the invention.

FIG. 3 is a flow diagram of a synchronization process 300 according to another embodiment of the invention. The synchronization process 300 is, for example, performed by a host computer, such as the host computer 104 illustrated in FIG. 1.

The synchronization process 300 initially identifies 302 media assets to be copied to a media device. A decision 304 then determines whether the media device has adequate available storage capacity to store all the identified media assets. In one embodiment, the available storage capacity for the media device can be determined by media device capabilities provided by the media device. For example, the media device might indicate that it has ten gigabytes of free space and five gigabytes of previously stored media assets. The available storage capacity can then be considered ten gigabytes or fifteen gigabytes depending upon user preference or depending on whether the presently stored media assets necessarily need to be maintained.

In any case, when the decision 304 determines that the media device does not have adequate available storage capacity, a decision 306 determines whether additional processing is desired to attempt to reduce the amount of storage capacity required. When the decision 306 determines that such additional processing is not desired, then the synchronization process 300 is complete and ends with no synchronization being performed. Alternatively, when the decision 306 determines that the additional processing is to be performed, priorities of the identified media assets are determined 308. Each of the identified media assets can have a priority or can be associated with a priority. Then, the number of the identified media assets is reduced 310 based on the priorities of the identified media assets. Following the operation 310, the synchronization process 300 returns to repeat the decision 304 and subsequent operations so that whether the media device now has adequate available storage capacity can be reevaluated.

Once the decision 304 determines that the media device has adequate available storage capacity, the identified media assets are copied 312 to the media device. Typically, when the identified media assets are copied 312, media information pertaining to the identified media assets can also copied from the host computer to the media database within the media device. Thereafter, the synchronization process 300 is complete and ends with synchronization having been performed, at least to the extent of available storage capacity.

Figure 4A:
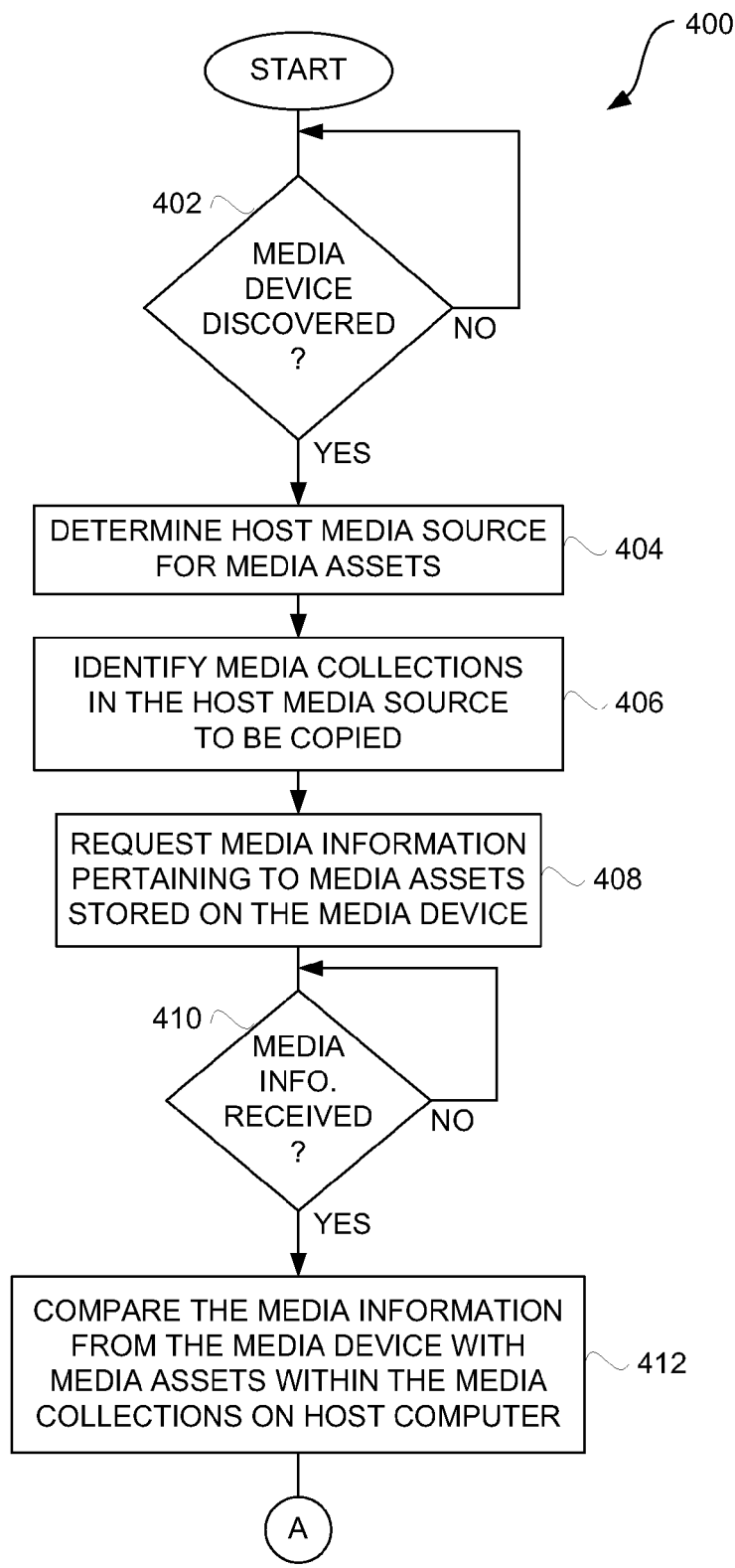
FIGS. 4A-4C are flow diagrams of a detailed synchronization process according to one embodiment of the invention.
Figure 4B:
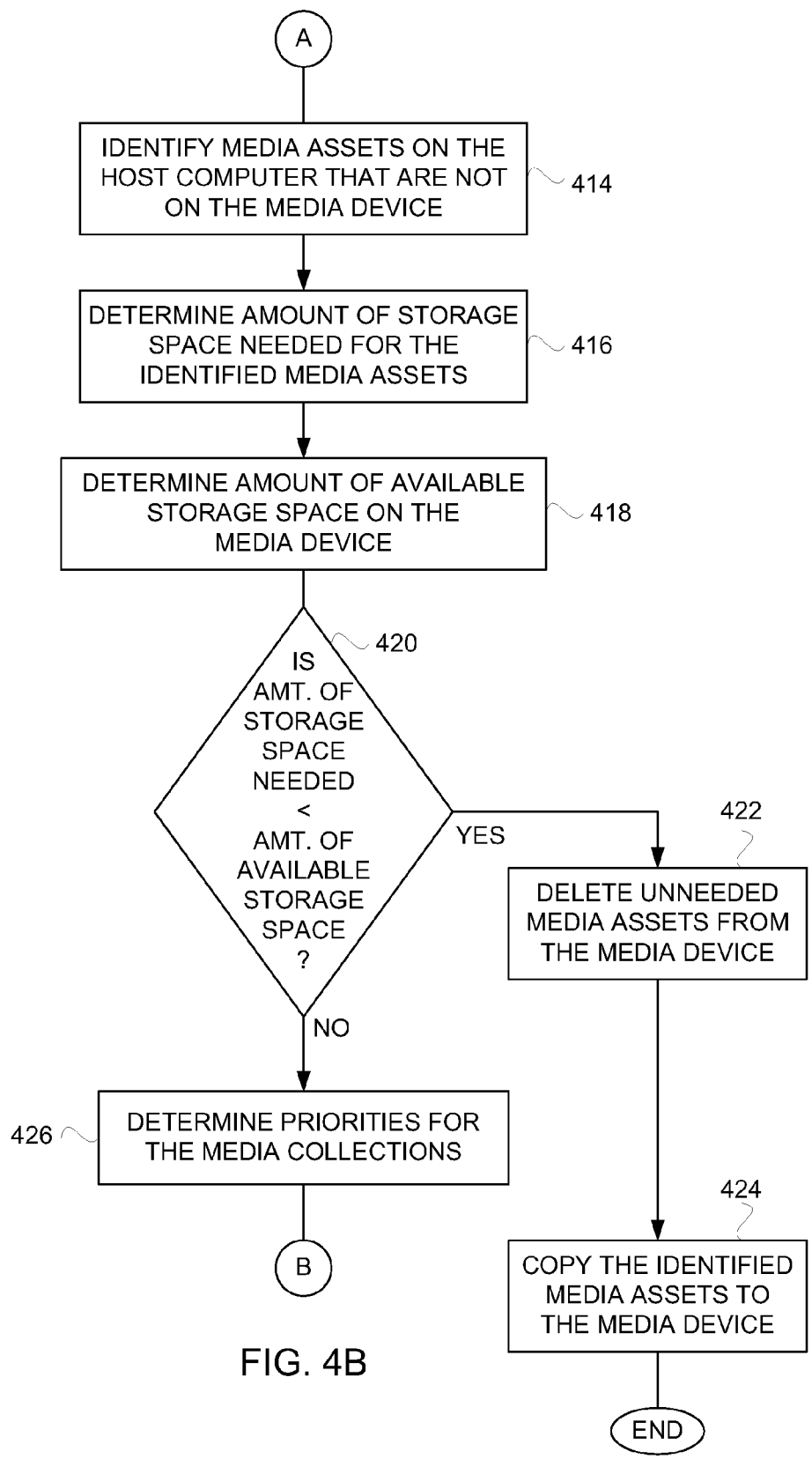
Figure 4C:
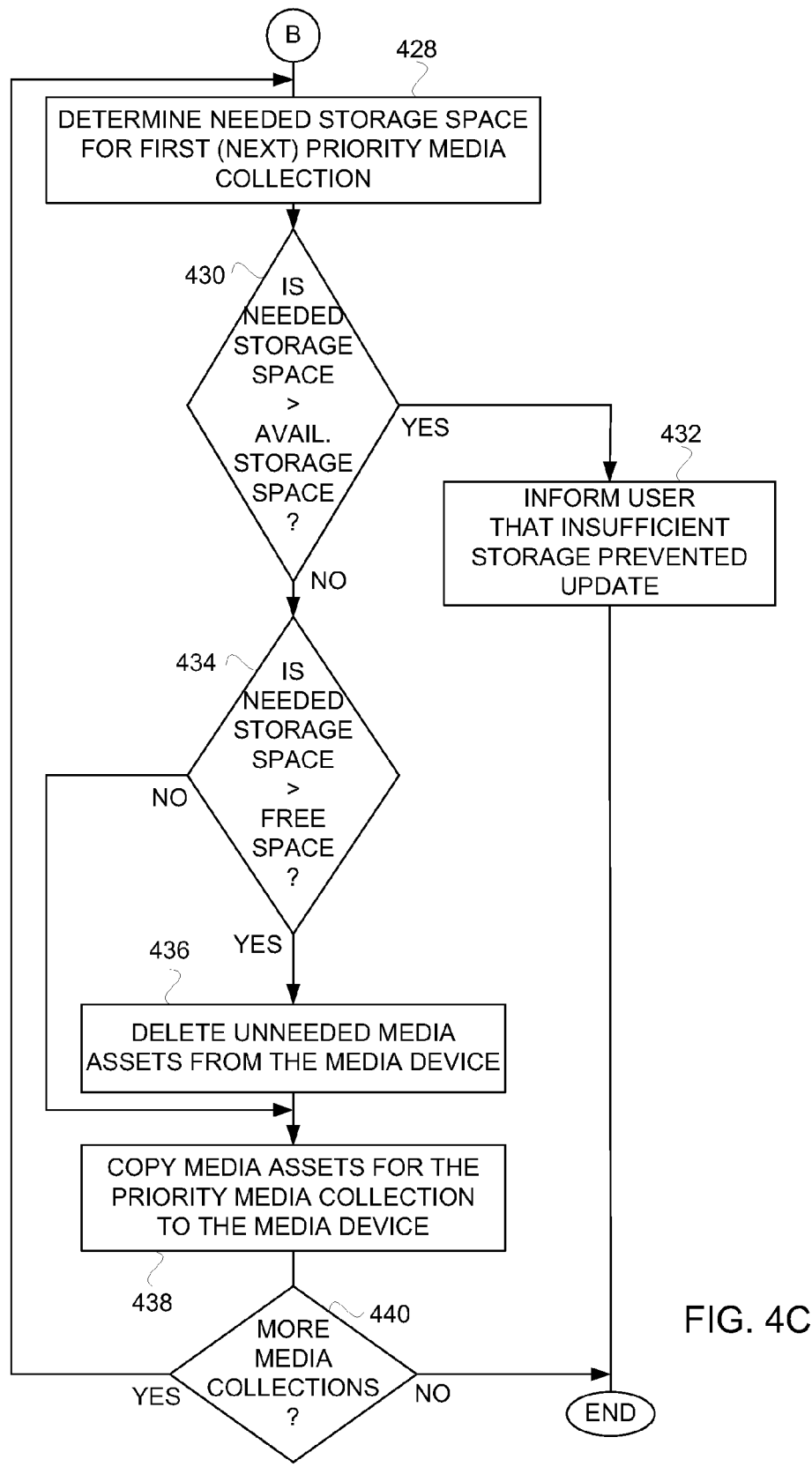

FIGS. 4A-4C are flow diagrams of a detailed synchronization process 400 according to one embodiment of the invention. The detailed synchronization process 400 is, for example, performed by a host computer, such as the host computer 104 illustrated in FIG. 1.

The synchronization process 400 begins with decision 402 that determines whether a media device has been discovered. Here, upon connection of a media device to the host computer, the host computer can detect or discover the presence of the media device. In such case, the host computer can automatically initiate a synchronization process. Hence, when the decision 402 determines that a media device has been discovered, the synchronization process 400 continues. In other words, the synchronization process 400 can be deemed invoked once a media device has been discovered.

When the synchronization process 400 continues, a host media source is determined 404 for media assets. Here, the host media source is typically determined by a user selection or setting with respect to a media management application. The host media source can pertain to a folder, library or grouping of media assets. Often, the host media source is associated with respect to an application program or file system. Next, media collections in the host media source to be copied are identified 406. Within the host media source, there are typically a plurality of media collections. These media collections can be indicated per user selections as to whether or not they are to be copied during the synchronization process 400. For example, when the media assets are photos, the media collections can pertain to photo albums.

Then, media information pertaining to media assets stored on the media device is requested 408. A decision 410 determines whether media information has been received from the media device. Once the media information from the media device has been received, the media information from the media device is compared 412 with those media assets within the media collections on the host computer. In one embodiment, the media information includes media attributes of the media assets which can be compared to determine which media assets are to be transferred. In one example, the media attributes include at least a title and an artist name for media assets that are audio files. In another example, the media attributes include an identifier, a modification date and a size for media assets that are image files. Based on the comparing 412, media assets on the host computer that are not on the media device are identified 414.

Next, an amount of storage space needed for the identified media assets is determined 416. In one embodiment, the size of the media assets are known or predetermined so that the amount of storage space required for the identified media assets can be computed at the host computer. In addition, an amount of available storage space on the media device is determined 418. This determination may be assisted by media device capabilities obtained from the media device. For example, the media device capabilities might indicate the amount free memory storage on the media device.

In any case, a decision 420 then determines whether the amount of storage space needed to store the identified media assets is less than the amount of available storage space on the media device. When the amount of storage space needed is less than the amount of available storage space, the synchronization can be immediately performed. Namely, any unneeded media assets can be deleted 422 from the media device, and the identified media assets can be copied 424 to the media device. It is not necessary that unneeded media assets be deleted 422, particularly when the memory device has sufficient free memory capacity to store the identified media assets without removing any of the previously stored media assets. After the identified media assets have been copied 424, the synchronization process 400 is complete and ends with the synchronization having been performed.

On the other hand, when the decision 420 determines that the amount of storage space needed is not less than the amount of available storage space, priorities for the media collections are determined 426. Here, it is assumed that the identified media assets are grouped into media collections, and that the media collections have a priority associated therewith. As explained in detail below with respect to FIG. 4C, the synchronization continues by synchronizing media assets of a media collection in accordance with the priority. Specifically, needed storage space for the priority media collection is determined 428. A decision 430 then determines whether the needed storage space for the first priority media collection is greater then the available storage space at the media device. When the needed storage space exceeds the available storage space, then the media collection is not able to be copied to the media device. In such case, the user can be informed 432 that insufficient storage prevented update (or further update). Thereafter, the synchronization process is complete and ends given that inadequate available storage space exists on the media device. It should be noted that the available storage space on the media device can consider previously stored media assets (of at least certain media types) to be part of the available storage space.

Alternatively, when the decision 430 determines that the needed storage space for storage of the priority media collection is not greater than the available storage space on the media device, a decision 434 determines whether the needed storage space is greater than the amount of free space on the media device. When the decision 434 determines that the needed storage space exceeds free space, then any unneeded media assets can be deleted 436 from the media device to free up additional available storage space. Optionally, prior to such deletion 436, a user warning or dialog can be presented to a user and enable the user to abort the synchronization process 400. Alternatively, when the needed storage space does not exceeds the free space, the operation 436 can be bypassed so that unneeded media assets need not necessarily be deleted 436 from the media device.

Following the operation 436, or its being bypassed, media assets for the priority media collection are copied 438 to the media device. Thereafter, a decision 440 determines whether more media collections are to be similarly processed. When the decision 440 determines that more media collection are to be processed, then the synchronization process 400 returns to repeat the operation 428 and subsequent operations so that a next priority media collection can be similarly processed. Alternatively, when the decision 440 determines that there are no more media collections to be processed, the synchronization process 400 is complete and ends.

Figure 5A:
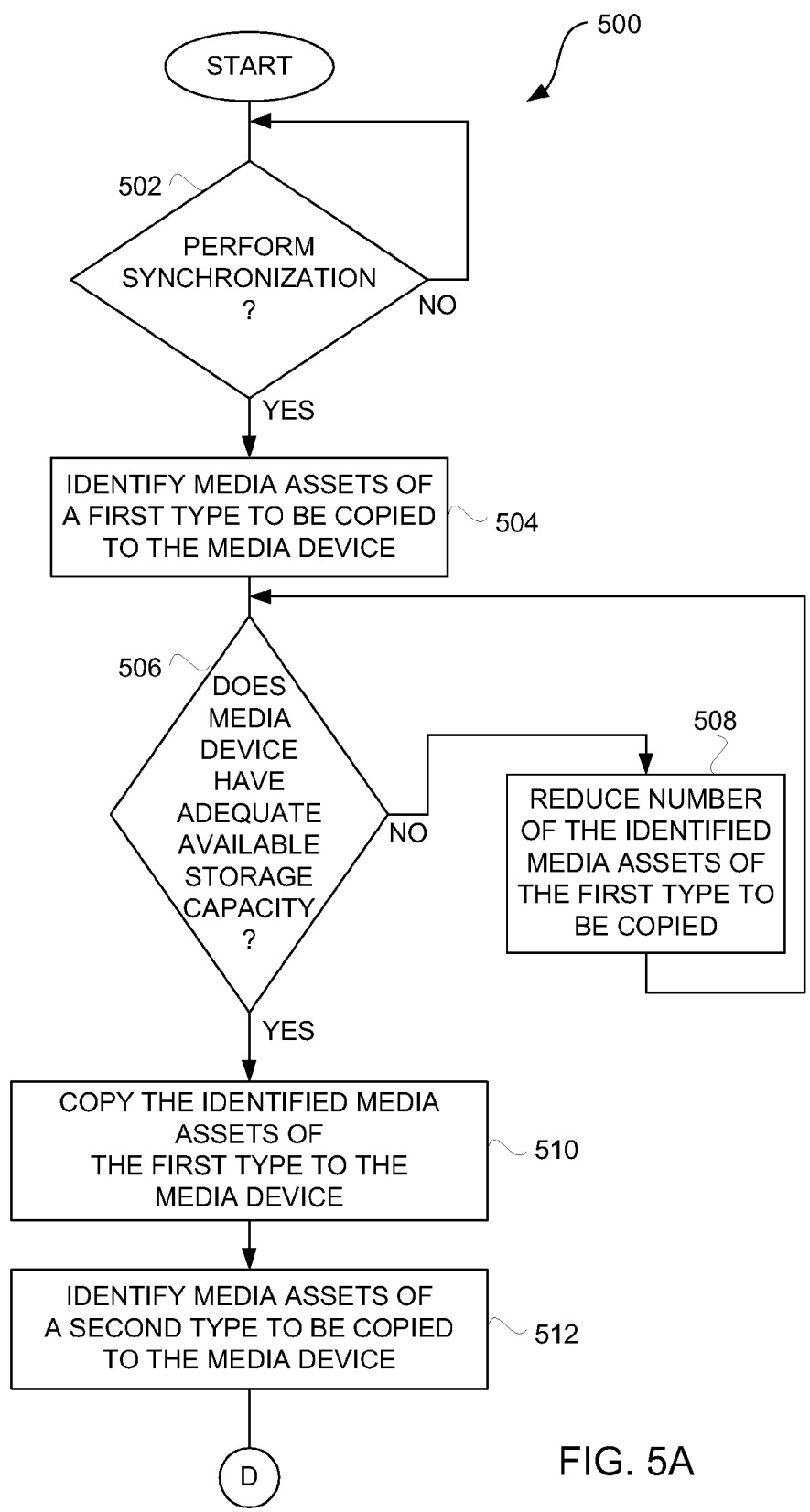
FIGS. 5A and 5B are flow diagrams of a multiple media synchronization process according to one embodiment of the invention.
Figure 5B:
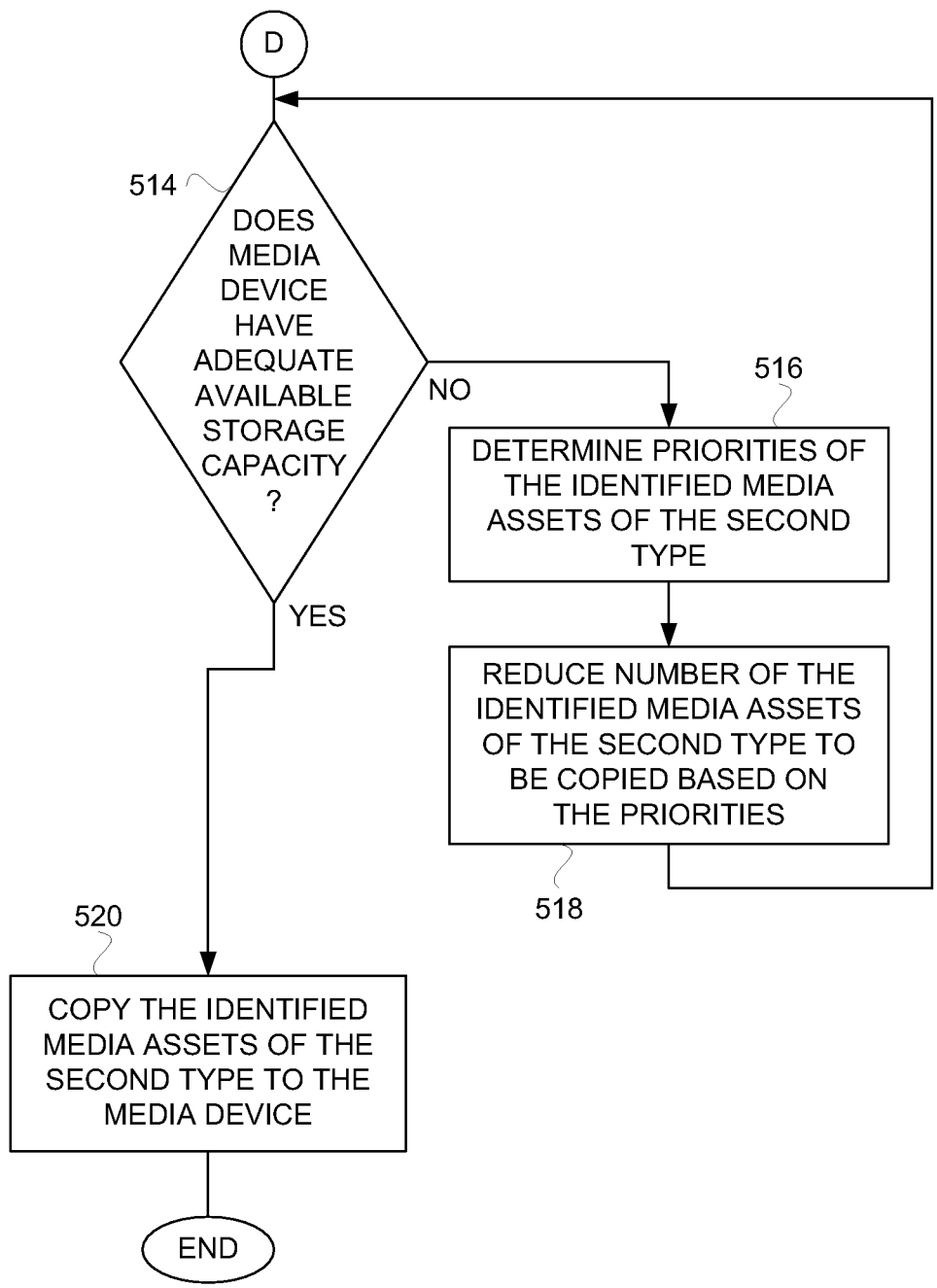

FIGS. 5A and 5B are flow diagrams of a multiple media synchronization process 500 according to one embodiment of the invention. The multiple media synchronization process 500 is, for example, performed by a media manager of a host computer, such as the media manager 106 illustrated in FIG. 1. Here, the multiple media can pertain to different types of media assets. For example, one type of media assets can be audio files, such as songs, and another type of media assets can pertain to images, such as photos.

The multiple media synchronization process 500 begins with a decision 502 that determines whether synchronization is to be performed. Synchronization can be requested by a user or automatically by the media manager. When the decision 502 determines that synchronization is not to be performed, the multiple media synchronization process 500 awaits the need for synchronization. In other words, the multiple media synchronization process 500 can be deemed to be activated when synchronization is to be performed.

Once synchronization is to be performed, media assets of a first type that are to be copied to the media device are identified 504. A decision 506 then determines whether the media device has adequate available storage capacity. The available storage capacity at the media device includes at least free space of the storage memory within the media device but can also include storage capacity associated with previously stored media assets that can be deleted. In any case, when the decision 506 determines that the media device does not have adequate available storage capacity, the number of the identified media assets of the first type to be copied can be reduced 508. Following the reduction 508, the multiple media synchronization process 500 returns to repeat the decision 506 to reconsider whether there is now adequate available storage capacity. Once the decision 506 determines that the media device has adequate available storage capacity, the identified media assets of the first type are copied 510 to the media device. Additionally, the media assets as stored at the host computer and the media device include media databases, and when media assets are copied, associated database information for such media assets can also copied.

Next, media assets of a second type to be copied to the media device are identified 512. A decision 514 then determines whether the media device has adequate available storage capacity. It should be noted that the available storage capacity of the media device considered at the decision 514 can consider all previously stored media assets of the second type as being available. If such storage space is needed, the previously stored media assets of the second type can be deleted from the memory storage of the media device.

In any case, when the decision 514 determines that the media device does not have adequate available storage capacity, priorities of the identified media assets of the second type are determined 516. Then, the number of the identified media assets of the second type that are to be copied is reduced 518 based on the priorities. Here, given that the media assets of the first type have already been copied to the media device, the media device offers less available storage capacity to store media assets of the second type. Hence, it is possible that the media device is unable to store any of the identified media assets of the second type. Further, it should be noted that the media assets of the second type can be grouped into collections, and that the reduction 518 of the number of the identified media assets of the second type can be performed in accordance with a collection so that the reduction process eliminates identified media assets on a collection basis. In any case, following the operation 518, the multiple media synchronization process 500 returns to repeat the decision 514 so that the determination of whether the media device has adequate available storage capacity can be reexamined.

In any event, once the decision 514 determines that the media device has adequate available storage capacity the identified media assets for the second type are copied 520 to the media device. Again, any associated database information can also be copied to the media device. Following the operation 520, the multiple media synchronization process 500 is complete and ends.

As previously noted, synchronization is a form of media management. The ability to automatically initiate synchronization was also previously discussed. Still further, however, the synchronization between devices can be restricted so as to prevent automatic synchronization when the host computer and media device do not recognize one another.

According to one embodiment, when a media device is first connected to a host computer (or even more generally when matching identifiers are not present), the user of the media device is queried as to whether the user desires to affiliate, assign or lock the media device to the host computer. When the user of the media device elects to affiliate, assign or lock the media device with the host computer, then a pseudo-random identifier is obtained and stored in either the media database or a file within both the host computer and the media device. In one implementation, the identifier is an identifier associated with (e.g., known or generated by) the host computer or its management module and such identifier is sent to and stored in the media device. In another implementation, the identifier is associated with (e.g., known or generated by) the media device and is sent to and stored in a file or media database of the host computer.

Figure 6:
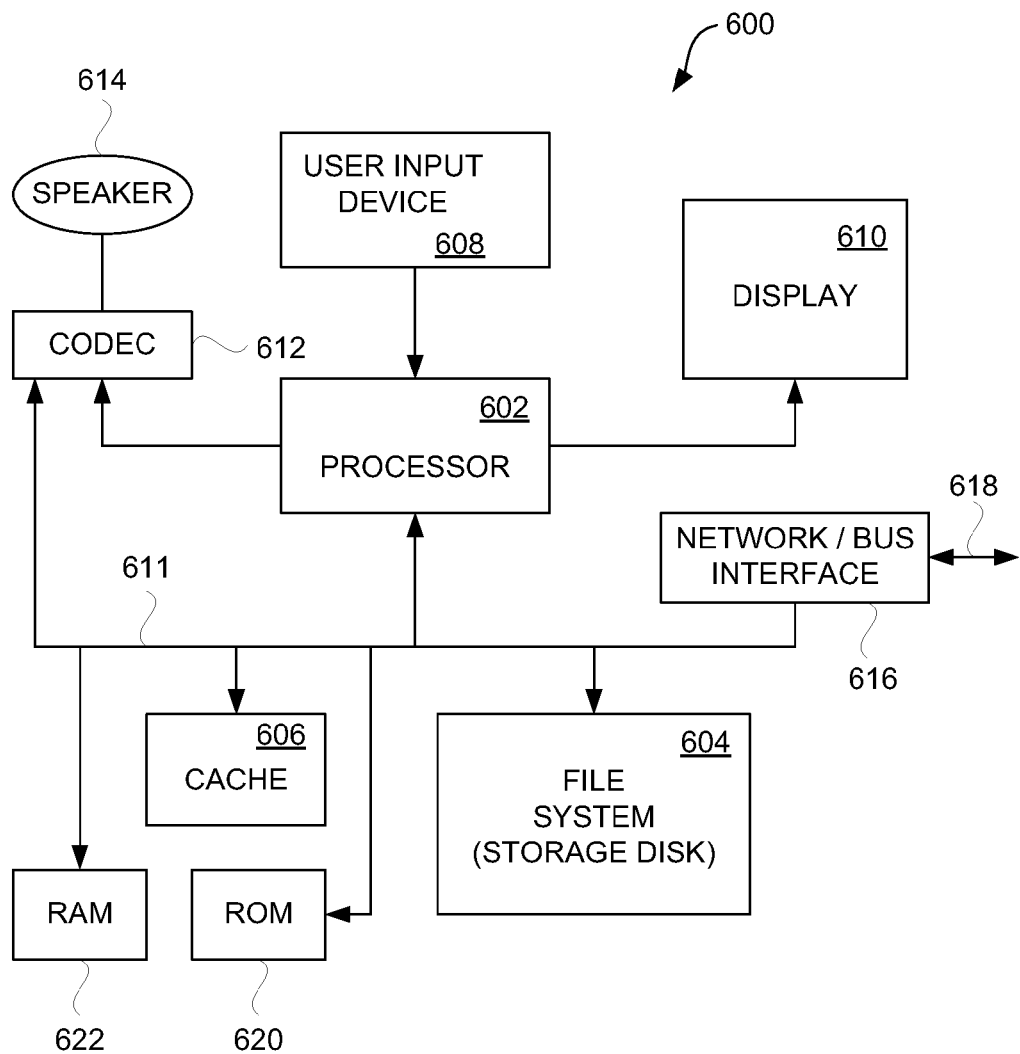
FIG. 6 is a block diagram of a media device according to one embodiment of the invention.

FIG. 6 is a block diagram of a media device 600 according to one embodiment of the invention. The media device 600 includes a processor 602 that pertains to a microprocessor or controller for controlling the overall operation of the media device 600. The media device 600 stores media data pertaining to media assets in a file system 604 and a cache 606. The file system 604 is, typically, a storage disk or a plurality of disks. The file system 604 typically provides high capacity storage capability for the media device 600. However, since the access time to the file system 604 is relatively slow, the media device 600 can also include a cache 606. The cache 606 is, for example, Random-Access Memory (RAM) provided by semiconductor memory. The relative access time to the cache 606 is substantially shorter than for the file system 604. However, the cache 606 does not have the large storage capacity of the file system 604. Further, the file system 604, when active, consumes more power than does the cache 606. The power consumption is often a concern when the media device 600 is a portable media device that is powered by a battery (not shown). The media device 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The media device 600 also includes a user input device 608 that allows a user of the media device 600 to interact with the media device 600. For example, the user input device 608 can take a variety of forms, such as a button, keypad, dial, etc. Still further, the media device 600 includes a display 610 (screen display) that can be controlled by the processor 602 to display information (including media assets, such as images) to the user. A data bus 611 can facilitate data transfer between at least the file system 604, the cache 606, the processor 602, and the CODEC 612.

In one embodiment, the media device 600 serves to store a plurality of media assets (e.g., songs) in the file system 604. When a user desires to have the media device 600 play a particular media asset, a list of available media assets is displayed on the display 610. Then, using the user input device 608, a user can select one of the available media assets. The processor 602, upon receiving a selection of a particular media asset, supplies the media data (e.g., audio file) for the particular media asset to a coder/decoder (CODEC) 612. The CODEC 612 then produces analog output signals for a speaker 614. The speaker 614 can be a speaker internal to the media device 600 or external to the media device 600. For example, headphones or earphones that connect to the media device 600 would be considered an external speaker.

In another embodiment, the media device 600 serves to store a plurality of media assets (e.g., images) in the file system 604. When a user desires to have the media device 600 display a particular media asset, a list of available media assets (e.g., by names or by thumbnail images, or by collections) can be displayed on the display 610. Then, using the user input device 608, a user can select one of the available media assets. Alternatively, the user can request a slide show to display a sequence of images (e.g., a collection of images). The processor 602, upon receiving a selection of one or more media assets, supplies the media data (e.g., image file(s)) for the particular media asset(s) to the display 610 where the image(s) are display for the user. As noted above, the image file(s) can be formatted (e.g., rendered) in advance at the host computer so that display of the image file(s) at the media device 600 is responsive and efficient (in terms of processing operations and power consumption at the media device).

The media device 600 also includes a network/bus interface 616 that couples to a data link 618. The data link 618 allows the media device 600 to couple to a host computer. The data link 618 can be provided over a wired connection or a wireless connection. In the case of a wireless connection, the network/bus interface 616 can include a wireless transceiver.

In general, the media player can correspond to one or more of: a music player, game player, video player, camera, mobile telephone (e.g., cell phone), personal digital assistant (PDA), and/or the like.

The host computer can also be a media device. In such case, the synchronization of media items can between two media devices.

The various aspects, embodiments, implementations or features of the invention can be used separately or in any combination.

Although the media assets in several of the above embodiments where images (e.g., photos), the media assets are not limited to images. For example, the media assets can alternatively, pertain to audio (e.g., songs), videos (e.g., movies) or images (e.g., photos), as different types of media assets. Also, as noted above, the different types of media assets can also be used together of host computers and media devices.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that a user of a portable media device is able to quickly and easily display media assets (e.g., images) that have been downloaded to the portable media device. Another advantage of the invention is that a portable media device can receive media assets (e.g., images) from a host computer in one or more formats that are useful to the portable media device. Still another advantage of the invention is that media assets (e.g., images) can be synchronized in accordance with priorities as to media types and/or priorities as to media collections. Still another advantage of the invention is that synchronization can be automatically initiated and performed upon connection of a media device to a host computer.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
   (a) identifying media assets at a host computer to be synchronized to a media device, the media assets being associated with media collections, each of the media collections including at least two of the media assets;
   (b) determining which of the identified media assets are not already stored on the media device;
   (c) determining a priority for each media collection having at least one of the determined media assets that are not already stored on the media device, wherein the priority is based on a respective asset type associated with each media collection having at least one of the determined media assets; and
   (d) when a storage space required by the determined media assets is greater than an available storage space at the media device, copying a portion of the determined media assets from the host computer to the media device on a media collection basis and in accordance with the priority for each media collection having at least one of the determined media assets that are not already stored on the media device, the portion of the determined media assets corresponding to a first asset type having a first priority that is greater than a second priority associated with media assets previously stored at the media device, wherein the portion of the determined media assets is identified based on an amount of storage space at the media device which is calculated by adding the available storage space at the media device with storage space used by those media assets previously stored at the media device having the second priority which is lower than the first priority associated with the portion of the determined media assets.

2. A method as recited in claim 1, wherein the media assets are images.

3. A method as recited in claim 1, wherein the media collections are albums, each of which contains one or more of the images corresponding to the determined media assets.

4. A method as recited in claim 1, wherein said identifying (a) is based on at least one user setting.

5. A method as recited in claim 1, wherein the priority for each of the media collections is influenced by the user.

6. A method as recited in claim 1, further comprising, prior to copying the portion of the determined media assets, formatting, by the host computer, the portion of the determined media assets according to media capabilities of the media device to yield rendered media assets, and wherein copying the portion of the determined media assets comprises copying the rendered media assets.

7. A method as recited in claim 6, wherein the rendered media assets are rendered images.

8. A method as recited in claim 1, wherein the portion of the determined media assets include at least one set of formatted media assets that were formatted at the host computer from a common original media asset.

9. A method as recited in claim 1, wherein media assets in the portion of the determined media assets are formatted based on capabilities associated with the media device prior to the copying, wherein formatting the media assets comprises reducing a respective data size of the media assets such that each of the formatted media assets has a first data size that is smaller than a second data size of a corresponding original media asset.

10. A method as recited in claim 1, wherein said method is automatically performed once the host computer detects a connection with the media device.

11. A method comprising:
   (a) identifying media assets residing on the host computer that are to be copied to a media device, the identifying further including:
      (a1) determining a host media source for the media assets;
      (a2) identifying media collections in the host media source to be copied; and
      (a3) determining media assets within the identified media collections that are not already stored on the media device, thereby identifying the identified media assets residing on the host computer that are to be copied to the media device;
   (b) determining whether the media device has adequate available storage capacity to store the identified media assets, the adequate available storage comprising storage space storing previously stored media assets set to be deleted from the media device;

(c) determining priorities associated with the identified media assets, wherein the identified media assets are associated with media collections, and the media collections having the priorities;

(d) reducing the identified media assets that are to be copied to the media device in accordance with the priorities when said determining (b) determines that the media device has inadequate available storage capacity to store the identified media assets; and (e) copying the identified media assets to the media device, after the reducing of the identified media assets to be copied, wherein said reducing (d) of the identified media assets that are to be copied to the media device or said copying (e) of the identified media assets to the media device comprises:

selecting a media collection with a highest priority;

determining an amount of storage space needed for the identified media assets within the selected media collection that are to be copied to the media device;

determining an amount of available storage space on the media device;

identifying an amount of storage space used by previously stored media assets having a lower priority than the identified media assets within the selected media collection;

comparing the amount of storage space needed with the amount of available storage space on the media device and the amount of storage space used by the previously stored media assets having the lower priority;

identifying a portion of the identified media assets within the selected media collection based on a storage space at the media device calculated by adding the amount of available storage space on the media device with the amount of storage space used by previously stored media assets having the lower priority than the portion of the identified media assets within the selected media collection; and copying the portion of the identified media assets within the selected media collection.

12. A method as recited in claim 11, wherein the priorities are based at least in part on different types of the media assets.

13. A method as recited in claim 11, wherein the priorities are based at least in part on user settings or indications.

14. A method as recited in claim 11, wherein said method is automatically performed once the host computer detects a connection with the media device.

15. A method as recited in claim 11, wherein said determining (b) comprises:

(b1) determining an amount of storage space needed for the identified media assets;

(b2) obtaining an amount of storage space available on the media device; and (b3) comparing the amount of storage space needed for the identified media assets to the amount of storage space available on the media device.

16. A method as recited in claim 11, wherein each of the identified media assets has a priority associated therewith.

17. A method as recited in claim 11, wherein the media assets are arranged in collections, and wherein the priorities are associated with the collections, and wherein those of the media assets within a collection have the priority of the collection.

18. A method as recited in claim 11, further comprising, prior copying the portion of the determined media assets, formatting, by the host computer, the portion of the identified media assets based on media capabilities of the media device to yield formatted media assets, wherein copying the portion of the identified media assets comprises copying the formatted media assets.

19. A method as recited in claim 18, wherein formatting the portion of the identified media assets comprises reducing a respective data size of each of the portion of the identified media assets such that each of the formatted media assets has a first data size that is smaller than a second data size of a corresponding original media asset.

20. A method as recited in claim 11, wherein said method further comprises:

(f) deleting one or more media assets previously stored on the media device prior to said copying (e) to increase available storage on the media device.

21. A method as recited in claim 11, wherein said copying (e) comprises:

freeing storage space at the media device used by at least one of the previously stored media assets to yield a reduced amount of available storage space, wherein the comparing is based on the reduced amount of available storage space.

22. A method as recited in claim 11, wherein said copying (e) comprises:

(e1) determining whether the storage capacity at the media device consumed by previously stored media assets is needed to store the identified media assets; and (e2) freeing the storage capacity at the media device of at least one of the previously stored media assets when said determining (e1) determines that the storage capacity at the media device consumed by previously stored media assets is needed; and (e3) copying the identified media assets to the media device.

23. A method comprising:

(a) identifying a number of media assets of a first type to be copied from a host computer to a media device;

(b) determining whether the media device has adequate available storage capacity to store the identified media assets of the first type, the adequate available storage comprising storage space used by previously stored media assets that have been identified for removal from the media device;

(c) reducing the number of media assets of the first type to be copied when said determining (b) determines that the media device has inadequate available storage capacity, wherein said reducing (c) comprises:

(c1) determining priorities associated with the identified media assets of the first type, the priorities being associated with collections of the identified media assets of the first type; and (c2) reducing, on a collection basis, the number of media assets of the first type to be copied based on the priorities, whereby those of the media assets of the first type having a lower priority are excluded;

(d) copying, following said reducing (c) if any, the identified media assets of the first type to the media device;

(e) identifying a number of media assets of a second type to be copied from the host computer to the media device;

(f) determining that the media device does not have adequate available storage capacity to store the identified media assets of the second type by comparing a storage space needed by the identified media assets of the second type with an available storage capacity;

(g) identifying a portion of the identified media assets of the second type for copying to the media device based on an amount of storage space calculated by adding the available storage capacity with a storage space used by previously stored media assets of a third type having a priority that is lower than a priority of the identified media assets of the second type; and (h) copying the identified media assets of the second type to the media device.

24. A method as recited in claim 23, wherein said reducing (g) comprises:
 (g1) determining priorities associated with the identified media assets of the second type; and
 (g2) reducing the number of media assets of the second type to be copied based on the priorities, whereby those of the media assets of the second type having a lower priority are more likely to be excluded.

25. A method as recited in claim 24, wherein the priorities are associated with collections of the identified media assets of the second type.

26. A method as recited in claim 25, wherein said reducing (g2) is performed on a collection basis.

27. A method as recited in claim 24, wherein the priorities are at least partly based on an input of a user associated with the host computer.

28. A method as recited in claim 23,
 wherein said copying (d) further copies database information associated with the identified media assets of the first type to the media device, and
 wherein said copying (h) further copies database information associated with the identified media assets of the second type to the media device.

29. A method as recited in claim 23, wherein the identified media assets of the first type are audio files, and wherein the identified media assets of the second type are image files.

30. A system comprising:
 a processor; and
 a computer-readable storage device having stored therein instructions which, when executed by the processor, cause the processor to perform operations comprising:
  (a) identifying media assets residing on a host computer that are to be copied to a media device;
  (b) determining that the media device does not have adequate available storage capacity to store the identified media assets;
  (c) identifying at least a portion of the identified media assets for copying, the portion of the identified media assets being identified based on an amount of storage space calculated by adding the available storage space and unavailable storage space associated with previously stored media assets having a lower priority than the portion of the identified media assets;
  (d) determining priorities associated with the portion of the identified media assets;
  (e) reducing the portion of the identified media assets that are to be copied to the media device in accordance with the priorities when said determining (b) determines that the media device has inadequate available storage capacity to store the portion of the identified media assets; and
  (f) copying at least part of the portion of the identified media assets to the media device.

31. A system as recited in claim 30, wherein the identified media assets are associated with collections, and the collections have the priorities, and
 wherein said reducing (e) of the identified media assets that are to be copied to the media device and said copying (f) of the identified media assets to the media device comprises:
 selecting a collection with a highest priority;
 determining an amount of storage space needed for the identified media assets within the collection that are to be copied to the media device;
 determining an amount of available storage space on the media device;
 comparing the amount of storage space needed with the amount of available storage space; and
 copying the identified media assets within the collection when said comparing indicates that the amount of available storage space exceeds the amount of storage space needed for the identified media assets within the collection.

* * * * *